March 21, 1967 L. H. WAGNER 3,310,779

MULTIPLEX DIGITAL TO DIGITAL CONVERTER USING DELAY LINE SHIFT REGISTER

Filed June 7, 1963 3 Sheets-Sheet 1

INVENTOR,
LEO H. WAGNER

BY *Edward J. Kelly,*
*Herbert Berl &*
*Julian C. Keppler*
ATTORNEYS

March 21, 1967 L. H. WAGNER 3,310,779

MULTIPLEX DIGITAL TO DIGITAL CONVERTER USING DELAY LINE SHIFT REGISTER

Filed June 7, 1963 3 Sheets-Sheet 2

INVENTOR,
LEO H. WAGNER

BY Edward J. Kelly, Herbert Berl & Julian C. Keppler

ATTORNEYS.

March 21, 1967 L. H. WAGNER 3,310,779

MULTIPLEX DIGITAL TO DIGITAL CONVERTER USING DELAY LINE SHIFT REGISTER

Filed June 7, 1963 3 Sheets-Sheet 3

INVENTOR,
LEO H, WAGNER

BY Edward J. Kelly, Herbert Berl & Julian C. Keppler
ATTORNEYS.

United States Patent Office 3,310,779
Patented Mar. 21, 1967

3,310,779

MULTIPLEX DIGITAL TO DIGITAL CONVERTER USING DELAY LINE SHIFT REGISTER

Leo H. Wagner, Oceanport, N.J., assignor to the United States of America as represented by the Secretary of the Army Filed June 7, 1963, Ser. No. 286,435
9 Claims. (Cl. 340—167)

The invention described herein may be manufactured and used by or for the Government for governmental purposes without the payment of any royalty thereon.

This invention relates to circuitry for processing binary information and more particularly to novel and useful circuitry capable of assembling serial binary information from a plurality of different input transmission lines into parallel form on a time division multiplex basis and conversely for distributing parallel binary information to a plurality of different output lines in serial form. The different input and output lines may be operating at mixed rates, that is, the bit rate or frequency of each line may be different. Briefly stated, the serial-to-parallel and parallel-to-serial conversion takes place in a shift register, the stages of which comprise delay lines. Each stage of the shift register is capable of storing a train of bits or pulses from the different input transmission lines on a time sequential basis, the storage capacity being determined by the pulse length, the physical length of the delay line and the propagation velocity therein. In effect, each incoming transmission line is assigned a different "time slot" in the delay lines for the storage of its binary information. A scanning device samples each incoming line of serial information in sequence and feeds to the serial input of the shift register a binary bit dependent on the binary signal appearing on each incoming line during the sampling thereof. The time delay or length of each delay line in the shift register is chosen so that any pulse therein will traverse the delay line in the time required to complete a single scan of all of the incoming lines. Thus during the first scanning cycle a sequence of bits representing the state of the signal on each line is stored in the first delay line of the shift register, the position of each bit within the first delay line being dependent on the order in which the incoming lines were sampled. The binary information in the first register stage is recirculated therein in synchronism with the scanning of the input lines. When the scanning process indicates that a new bit is present on any given incoming line, the first bit from this line is shifted to the next register stage and the new bit is inserted in the line's time slot in the first register stage. Thus the bits from all the incoming lines are fed into the shift register on a time division multiplex basis and progress along the shift register at a rate dependent on the bit rate or frequency of the individual lines. When an entire character from any given line has been assembled, circuitry is provided for reading out this character in parallel from the various stages of the shift register. This circuitry includes a novel multiplex counter which is tied in with the scanning circuitry and the shift register to separately count the number of bits received from each incoming transmission line on a time division multiplex basis and to provide a read signal when the register is full for each line.

It is therefore an object of the invention to provide novel and useful circuitry for processing binary information. It is a further object of this invention to provide a multiplex assembler-distributor capable of assembling or distributing binary data from or to a plurality of different transmission lines on a time division multiplex basis. Other objects and advantages of the invention will become apparent from the following detailed description and drawings, in which.

Figure 1:
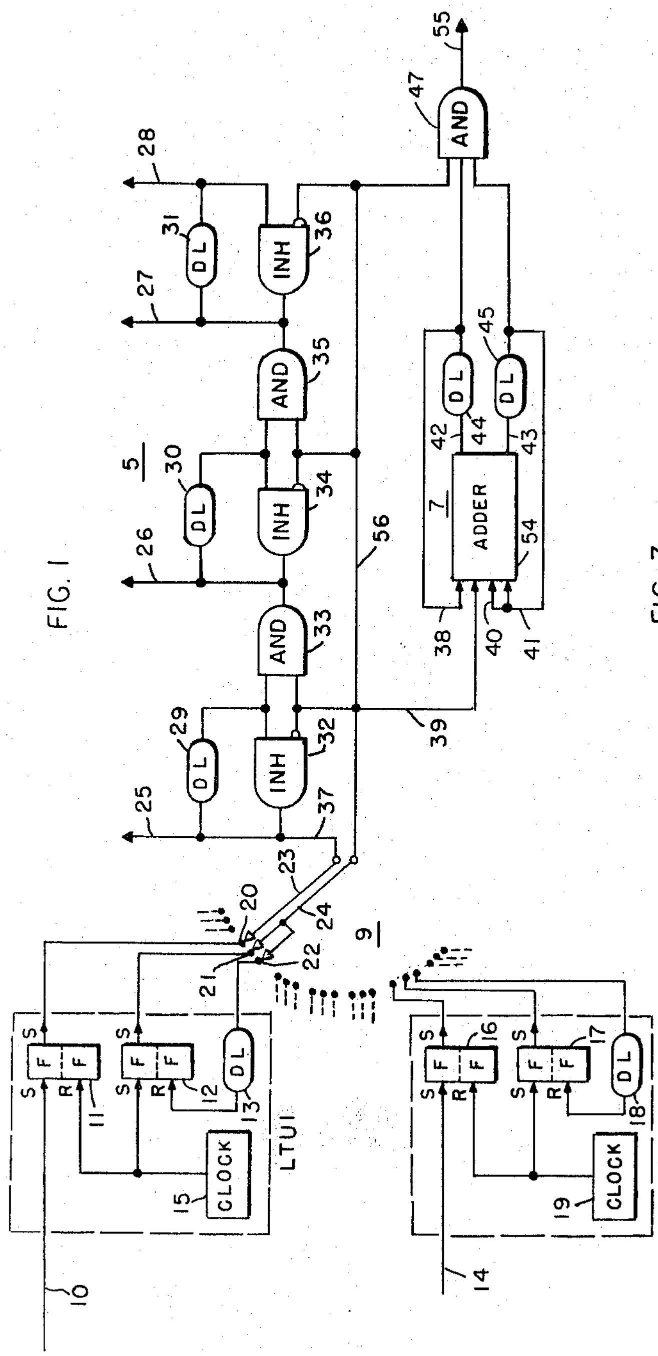
FIG. 1 is a schematic diagram illustrating how the invention may be used as a multiplex assembler.

Referring to FIG. 1, the multiplex assembler shown therein includes a shift register 5 comprising three delay lines 29, 30 and 31 and gating circuits 32–36, a scanner 9, multiplex counter 7 including adder 54, delay lines 44 and 45 and AND gate 47, and a plurality of incoming line terminal units, two of which, LTU1 and LTU*n*, are illustrated in detail. The scanner 9 is a switch means for sequentially sampling the data in each of the line terminal units and feeding it in serial form to the input 37 of the shift register. The scanner is illustrated as a rotating switch, the poles of which sequentially contact a circumferential array of contacts in groups of three. Each group of contacts is connected to a different line terminal unit. Each of the incoming lines carrying binary data in pulse, no-pulse form is terminated in a line terminal unit, all of which contain identical circuitry. LTU1 is connected to incoming line 10 and LTU*n* is connected to incoming line 14. LTU1 contains a line flip-flop 11, the set input of which is conected to input line 10. The reset input of 11 is connected to the output of line clock 15. The line clock is a pulse generator which is synchronized with the incoming binary data so that a clock pulse is produced just prior to the appearance of each bit of data on the incoming line. The line clock is also connected to the set input of timing flip-flop 12, the set output of which is connected to scanner terminal 21. The reset input of flip-flop 12 is connected to scanner terminal 22 via delay means 13. The set output of line flip-flop 11 is connected to scanner terminal 20. A mark or 1 bit on the incoming lines is represented by the presence of a D.C. voltage or pulse thereon and a space or 0 is represented by the absence of a voltage or pulse. With the illustrated circuitry incoming mark or 1 signals will set the line flip-flop but incoming space or 0 signals will have no effect thereon. Since the line flip-flop is reset at the end of each line baud or bit, the set output of the line flip-flop will be a replica of the line signal. The setting of the timing flip-flop by the line clock indicates that a new bit of information is available on the line and the next scan of the line will place this bit at the shift register input. The scanning action will also initiate the resetting of the timing flip-flop, since the scanner arm shorts terminals 21–22.

The parallel readout of the information in the shift register is taken from lines 25–28. The circuitry is therefore capable of assembling the serial line data from each line in groups or characters of four bits each. The gating circuitry of the shift register comprises a means for selectively shifting the data in any stage thereof to the input of the next stage or recirculating the data therein depending on whether or not a new bit of data is present on a scanned line. This circuitry comprises the gates 32–36. The output of delay line 29 is connected to one input of AND gate 33 and one input of inhibit gate 32. The other input of gate 33 and the inhibit input of gate 32 are connected to shift lead 56. The output of gate 32 is connected to the input of delay line 29 and the output of gate 33 is connected to the input of the next succeeding register stage. Inhibit gate 34 and AND gate 35 are similarly connected to the second and third register stages 30 and 31, respectively. Inhibit gate 36 has an input connected to the output of the last register stage 31, and inhibit input connected to lead 56 and its output connected to the input of register stage 31.

Figure 3:
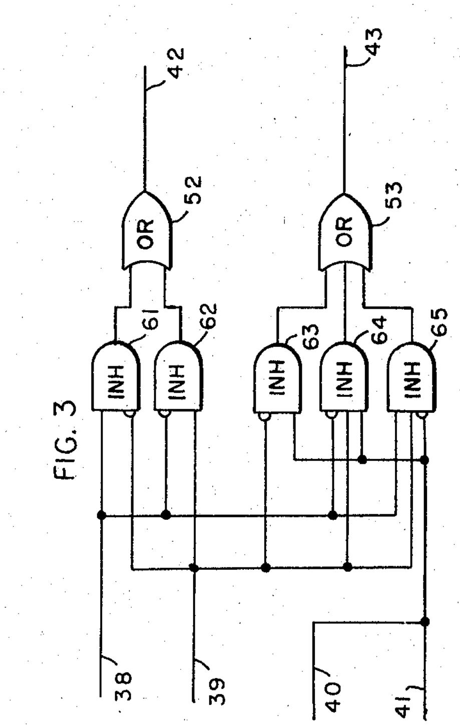
FIG. 3 is a detailed diagram of one embodiment of the adder of FIG. 1.

The circuitry of multiplex counter 7 comprises an adder 54 with four inputs 38, 39, 40 and 41. The input 39 is connected to the set output of the timing flip-flop of the input line being scanned via contact 21 and scanner arm 24. The input 38 is connected to the output of delay line 44 and inputs 40 and 41 are both connected to the output of delay line 45. The output of delay lines 44 and 45 also form two of the inputs of AND gate 7, the remaining input of which is connected to lead 56. The output of adder 54 appears on leads 42 and 43. The adder output is a binary number equal to the number of its inputs on which voltages or pulses appear. The output 42 represents the least significant binary digit and output 43 the most significant. For example, if an input appears at 39 only, the adder will produce the binary number 01 which would be represented by a 0 from output 43 and a 1 from output 42. If an input appears at two of the four inputs, the binary number 10 would appear at the output and would be represented by a 0 at output 42 and a 1 at 43, etc. With input signals at all four inputs the adder output will reset to zero. FIG. 3 shows a detailed circuit of adder 54 which will produce the above-described results. The input and output terminals therein bear the same reference numerals as does adder 54 of FIG. 1. The adder circuitry of FIG. 3 comprises five inhibit gates 61–65 and two OR gates 52 and 53. It will be apparent to those skilled in the art that the circuit of FIG. 3 will yield the desired results, hence no detailed explanation of this circuit is deemed necessary.

Figure 2:
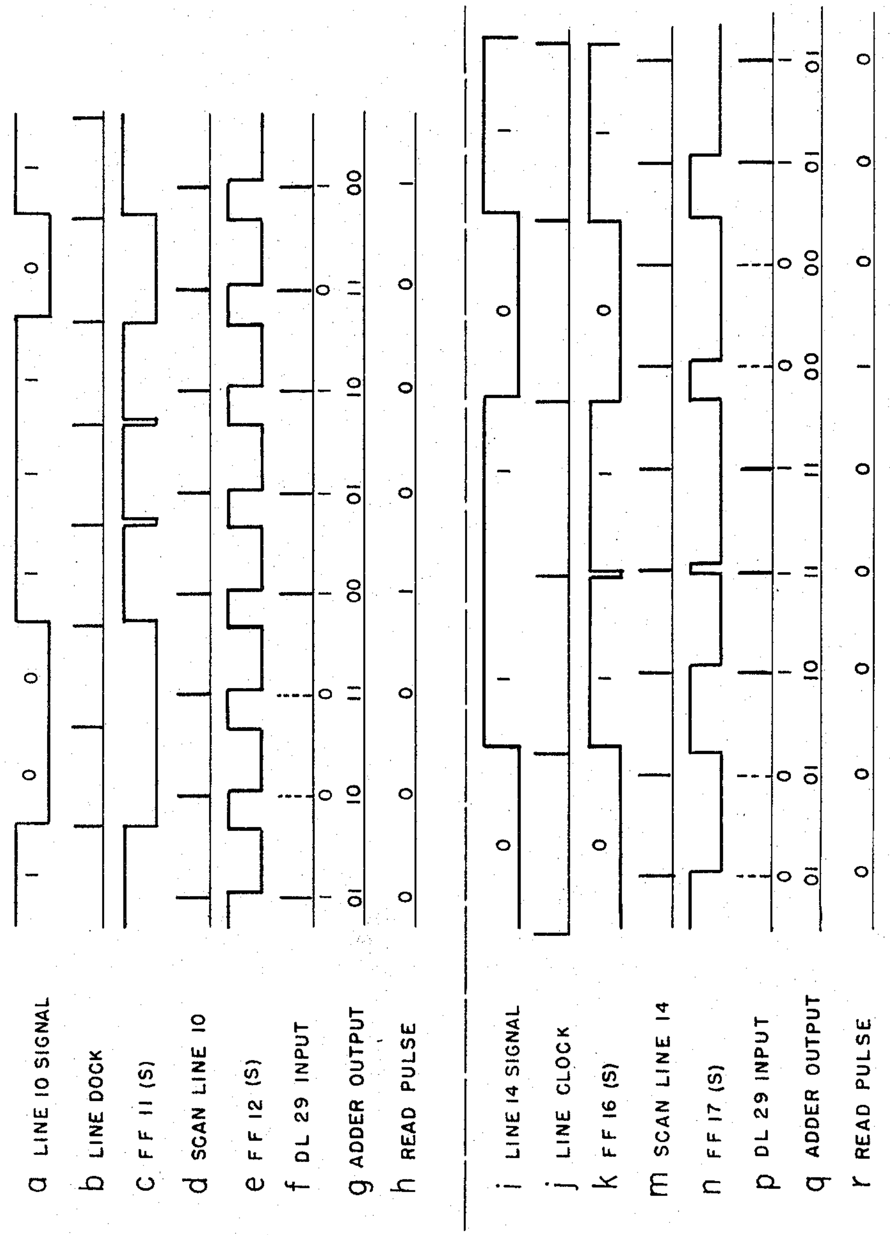
FIG. 2 is a timing diagram useful in explaining the operation of the circuitry of FIG. 1.

The operation of the circuit of FIG. 1 will now be explained with reference to the timing diagram of FIG. 2. FIG. 2*a* shows the binary signal on line 10 and FIG. 2*i* the signal on line 14. It is assumed that the line 10 signal has a bit frequency the same as the scanning frequency of scanner 9, that is, the bit length on line 10 is the same as the time required for the scanner to make one revolution and thus sample each line once. The bit frequency on line 14 is an arbitrary frequency lower than that of line 10. The signal on line 10 is shown as 10011101. The first 1 or mark therein will set flip-flop 11, the set output of which is shown in FIG 2*c*. As the scanner samples line 10 for the first time the mark signal at the set output of flip-flop 11 will be fed to the input of delay line 29 via scanner arm 23 and lead 37. The scanner sample line 10 at times indicated by the vertical lines of FIG. 2*d*. FIG. 2*e* is the set output of timing flip-flop 12 of LTU1. As line 10 is scanned the set output of 12 is fed via contact 21 and scanner arm 24 to shift lead 56 and input 39 of adder 54. The set output of 12 is also fed to the reset input thereof via contacts 21 and 22 and delay line 13. Thus the scanning resets flip-flop 12 after a slight delay. During the second scan or sampling of line 10, line flip-flop 11 will remain reset since the second bit on line 10 is 0 and a 0 will be launched down delay line 29 at this time. As previously stated, the length or time delay of each register delay line is made equal to one cycle of operation of the scanner. Therefore, any bit fed to any delay line during one scan of any given input line will appear at the output of the same delay line during the following scan of this line. Thus, the 1 which was applied to the input of delay line 29 during the first scan of line 10 will appear at the output of 29 during the second scan of this line. Since the line clock 15 has set timing flip-flop 12 between the first and second scans, a pulse or 1 signal will appear on lead 56 and adder input 49 during the second scan of line 10. This pulse on lead 56 will inhibit gate 32 and enable or open gate 33 and thus apply the 1 which emerges at the output of delay line 29 to the input of delay line 30. During the third scan of line 10, the 0 which comprises the third bit on this line is fed to the input of 29, the second bit of the binary signal emerges from the output of 29 and is fed to the input of 30 via gate 33 which has been enabled by the signal on line 56. Simultaneously, the first bit emerges from the output of delay line 30 and is fed through open gate 35 to the input of delay line 31. During the fourth scan of line 10, the first bit of the line 10 signal will have traversed delay line 31 and will appear on the output thereof at lead 28. Simultaneously, the second bit will emerge from delay line 30 and be applied to lead 27 through open gate 35, the third bit will similarly appear on lead 26 and the fourth bit on lead 25. The first four serial bits from line 10 have now been assembled in parallel form on leads 25–28. During the fourth scan of line 10, all three inputs of AND gate 47 will be energized and a read pulse will appear at the output thereof on lead 55. This read pulse will actuate external circuitry for sensing and feeding the signals on leads 25–28 to a utilization device, not shown.

The operation of the multiplex counter 7, which produces the read pulse, will now be described. During the first scan of line 10, a 1 or pulse is applied to the input 39 of adder 54 from the timing flip-flop 12. The adder output will therefore be the binary number 01 which will be represented by a 1 at output 42 and 0 at output 43, as explained above. Therefore, during the first scan of line 10 a pulse will be applied to delay line 44 from adder output 42. The length or time delay of each of the delay lines 44 and 45 is the same as that of the shift register delay lines 29–31. During the second scan of line 10 a pulse will again be applied to adder input 39 from the timing flip-flop 12. During the second scan the pulse which was applied to delay line 44 during the first scan will emerge therefrom and be applied to adder input 38. Thus during the second scan the adder has pulses at two inputs and the output will shift to the binary number 10, which is represented by a pulse or 1 at output 43 and a 0 or no-pulse at output 42. Thus, during the second scan of line 10 a pulse is applied to the input of delay line 45. During the third scan of line 10, the pulse applied to delay line 45 during the second scan will emerge therefrom and be applied to adder inputs 40 and 41. The adder will now have inputs on leads 39, 40 and 41 and the output will shift to binary 11, which is represented by pulses or 1's at both outputs 42 and 43. Thus during the third scan of line 10 pulses are applied to the inputs of both delay lines 44 and 45. During the fourth scan of line 10 these pulses emerge from delay lines 44 and 45 and form two inputs of AND gate 47. Simultaneously, the scanner applies the output of flip-flop 12 to shift lead 56 which forms the third input of AND gate 47, thus generating the read pulse on lead 55. FIG. 2*f* shows the input to delay line 29, FIG. 2*g* shows the adder output and FIG. 2*h* the output of AND gate 47 during the scanning of line 10.

The above-described sequence of operations applies to the case in which the line bit frequency or rate is the same as the scanning frequency. At line bit frequencies lower than the scanning frequency, recirculation of the data within the shift register stages and the multiplex counter occurs. The mode of operation for such a case will be explained with reference to the waveforms of FIG. 2*i* through 2*r*. It is assumed that the serial binary signal of FIG. 2*i* appears on line 14 of FIG. 1 and is applied to LTU*n*. The bit length on line 14 is arbitrarily shown as approximately 75% longer than the bit length on line 10. This means that the bit frequency on line 14 is approximately 58% lower than that of line 10. It can be seen from FIG. 2*m* that the scanning of line 14 takes place at the same frequency as the scanning of line 10, but at different times or phase. FIG. 2*j* shows the output of the clock 19 of LTU*n* and FIG. 2*k* the set output of line flip-flop 16. FIG. 2*n* is the set output of timing flip-flop 17. FIG. 2*p* shows the signal at the input of delay line 29 during the scanning of line 14. FIG. 2*q* shows the output of adder 54 and FIG. 2r the output of AND gate 47. During the first scan of line 14 and 0 on line 14 is applied to the input 37 of the first delay line 29 from the set output of flip-flop 16. Simultaneously, the timing flip-flop 17 is reset via delay line 18 and a pulse appears at the input 39 of adder 54. The resultant binary 01 output of the adder then applies a pulse to delay line 44. At the second scan of line 14, it is seen that the first data bit (0), is still on this line and the line clock 19 has not yet set the timing flip-flop 17. The absence of a pulse from timing flip-flop 17 on lead 56 permits the 0 signal which emerges from the output of delay line 29 to be recirculated to the input of 29 via inhibit gate 32. Also, the pulse in counter delay line 44 will appear at the output thereof and be applied to adder input 38. Since there is no pulse on adder input 39 during the second scan of line 14, the adder output will again be binary 01 which again applies a pulse to counter delay line 44. At the end of the first bit on line 14, the line clock 19 sets the timing flip-flop 17 and the line signal (1) sets the line flip-flop 16. During the third scan of line 14 a shift pulse appears on lead 56 from flip-flop 17 and shifts the 0 which emerges from delay line 29 to the input of delay line 30 via enabled gate 33. It should be noted that the shift pulse on lead 56 inhibits gate 32 and prevents recirculation. During the third scan the second bit of data (1) from line 14 is launched down delay line 29. Also, the shift pulse on lead 56 is applied to input 39 of the adder and the pulse which simultaneously emerges from counter delay line 44 is applied to adder input 38. This produces a binary 10 from the adder which applies a pulse to counter delay line 45. At the end of the second bit on line 14 the line clock resets the line flip-flop 16 and also sets the timing flip-flop 17. During the fourth scan of line 14 the third bit of data (1) is launched down delay line 29, the shift pulse on lead 56 simultaneously shifts the first bit (0) to the input of delay line 31 and the second bit (1) to the input of delay line 30. Also the pulse which emerges from counter delay line 45 is applied to adder inputs 40 and 41 and the shift pulse is applied to adder input 39. This advances the output of the adder to 11 which applies pulses to both counter delay lines 44 and 45. It can be seen from FIG. 2 that the fifth scan of line 14 takes place while the 1 which was read into the shift register previously is still on line 14. Therefore, there is no shift pulse from flip-flop 17 and the first three binary bits are recirculated in the three delay lines of the shift register. Also, during the fifth scan of line 14, the pulses in counter delay lines 44 and 45 are recirculated therein, since the pulses applied to inputs 38, 40 and 41 of the adder from the outputs of these delay lines will produce an adder output of 11 to launch pulses in both counter delay lines. During the sixth scan of line 14 the fourth bit of the line signal will appear on lead 25, the shift pulse on lead 56 will place the third bit on lead 26, the second bit on lead 27 and the first bit on lead 28. The coincidence of the pulse outputs of the counter delay lines 44 and 45 and the shift pulse on lead 56 during the sixth scan generates the read pulse for line 14 on lead 55.

From the above description it is apparent that the circuitry can assemble serial data from a plurality of lines operating at different transmission rates on a time division multiplex basis. The only restriction is that the line transmission rates must not exceed the scanning frequency.

Figure 4:
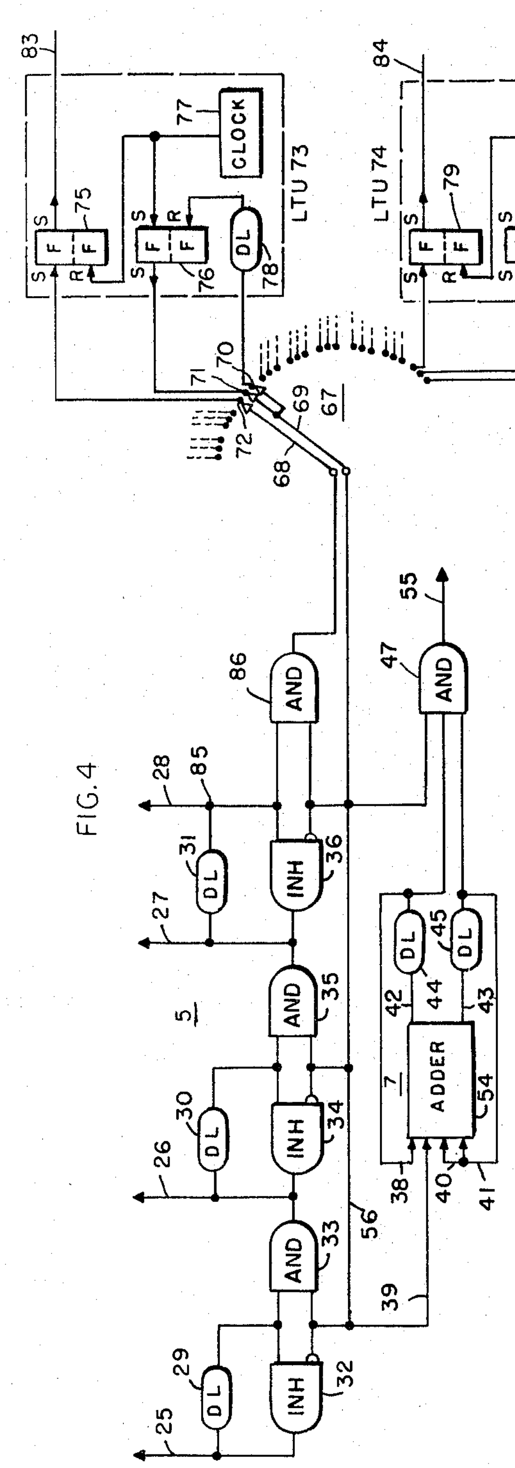
FIG. 4 is a schematic diagram illustrating how the invention may be used as a multiplex distributor.

In FIG. 4 the circuitry is arranged as a multiplex distributor or parallel-to-serial converter. The circuitry and operation is similar to that of FIG. 1 and corresponding components thereof bear the same reference characters. In FIG. 4, parallel binary characters of four bits each are sequentially applied to the four parallel inputs 25–28 of shift register 5 under the control of a write pulse obtained from the output 55 of AND gate 47. Each character is then shifted along shift register 5 and appears in serial form at the serial output 85 thereof. Scanner 67 distributes the serial data to a plurality of outgoing line terminal units, each of which is connected to an outgoing serial transmission line. The bit frequency of each outgoing line may be different and is controlled by a line clock in each outgoing line terminal unit. A timing flip-flop within each outgoing LTU applies a shift pulse to the shift lead 56 of the shift register whenever its line is ready to accept a new bit of data. The scanner then applies the bit at serial output 85 to the proper outgoing LTU and the remaining bits of the character are shifted along the shift register toward the serial output thereof. If any outgoing line is not ready to accept a new bit of data as it is scanned the data is recirculated within the shift register. Scanner 67 is similar to scanner 9 of FIG. 1 and includes a circumferential array of contacts arranged in groups of three, the rotating arm 68 being connected to the output of AND gate 86 and arm 69 to shift lead 56. The two inputs of AND gate 86 are the shift register serial output 85 and shift lead 56. Each group of scanner contacts is connected to one of the outgoing line terminal units, two of which, LTU73 and LTU74 are illustrated in detail. LTU73 contains line flip-flop 75, the set input of which is connected to scanner terminal 72. The set output of 75 is fed to outgoing serial line 83. Line clock 77 is connected to the reset input of the line flip-flop and also to the set input of timing flip-flop 76, the set output of which is connected to scanner terminal 71. The reset input of the timing flip-flop is connected to scanner terminal 70. The line clock determines the frequency at which the data in the shift register is sent out over the outgoing line. In explaining the operation of the circuitry as a distributor it will be assumed that while the scanner is contacting contacts 70–72, as illustrated, a write pulse appears at the output 55 of AND gate 47. The pulse at 55 initiates the application of a four bit parallel character to shift register leads 25–28 from external circuitry, not shown. Simultaneously, a shift pulse is applied to shift lead 56 from the set output of flip-flop 76 via contact 71 and scanner arm 69. The pulse on 56 applies the data bit on lead 28 to the set input of flip-flop 75 via gate 86, scanner arm 68 and contact 72. This data bit will either set flip-flop 75 or leave it reset depending on whether it is a 0 or 1 and a corresponding bit will be fed out to line 83 from the set output of 75. Simultaneously, the set output of 76 will be fed back to the reset input thereof via scanner contacts 71 and 70 and delay means 78, resulting in a delayed reset of the timing flip-flop. As in the circuit of FIG. 1, the length of each of the register delay lines as well as the counter delay lines is equal to one cycle or period of the scanner. The first of the four parallel bits is now on the outgoing line 83 and, as the scanner leaves contacts 70–72, the other three bits of this character begin to travel down delay lines 29–31 from parallel input leads 25–27. If line clock 77 has not set timing flip-flop 76 before the next succeeding scan of LTU73, no shift pulse will appear on lead 56 and the other three bits of data which now are at the outputs of delay lines 29–31 will be recirculated therein via gates 32, 34, and 36. When line clock 77 sets flip-flop 76, the next succeeding scan of LTU73 will apply the second of the four bits from the serial output 85 to line flip-flop 75 and thence to outgoing line 83. This process continues until all four bits have been applied to the outgoing line. It can be seen that four pulses on shift lead 56 are necessary to read out all four bits to a given line. The operation of multiplex counter 7 is the same as in FIG. 1. Each time that a bit is fed out to a given line terminal unit from the serial output of the shift register, the counter reading is increased by one in the time slot assigned to the given line. Thus when all four bits have been fed out to a given line the counter will produce a read pulse at 55 to apply a new four bit character to shift register leads 25–28. It should be noted that the bit transmission frequency on the outgoing lines may be any frequency equal to or less than the scanning frequency of scanner 67.

Figure 5:
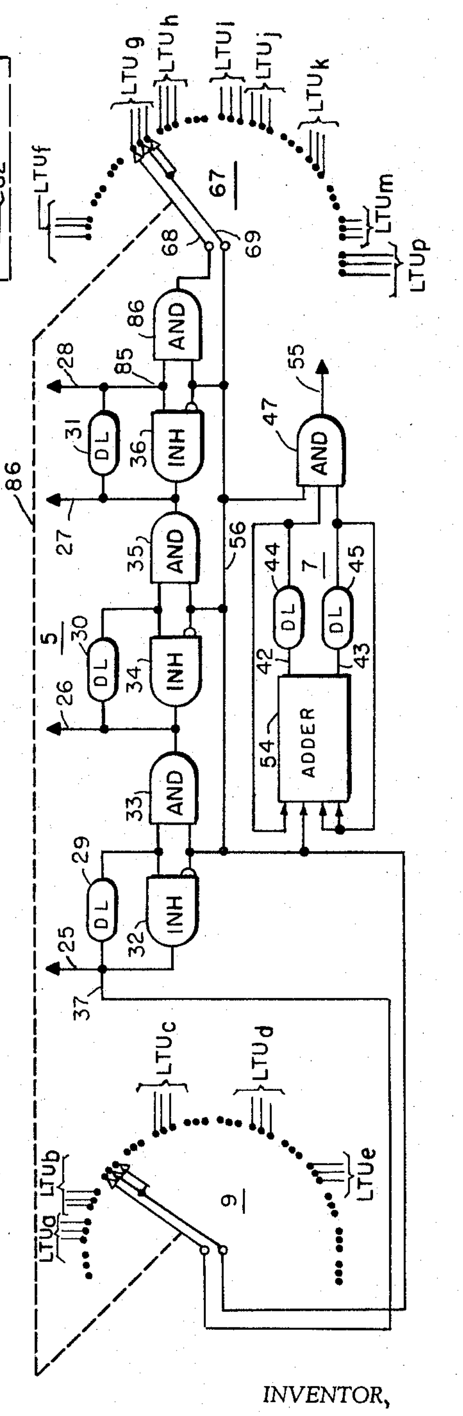
FIG. 5 shows how the circuitry may be arranged to form a multiplex assembler-distributor.

By combining the assembler of FIG. 1 and the distributor of FIG. 4 it is possible to construct a circuit which can perform both serial-to-parallel and parallel-to-serial conversion on an intermixed basis. Such a combined multiplex assembler-distributor is illustrated in FIG. 5. It is apparent from the above descriptions of FIGS. 1 and 4 that the shift register 5 and the multiplex counter 7 operate in essentially the same manner whether the circuitry is operated as an assembler or a distributor. Therefore, by assigning some of the time slots of the register and counter to assembling and other of the time slots therein to distributing, it is possible for the circuit to intermix the assembly and distribution functions. This is accomplished by providing two scanners, one an incoming assembler scanner and the other an outgoing distributor scanner, which are rotated in synchronism and in phase with each other. The assembler scanner is connected to a plurality of incoming line terminal units and the distributor scanner is connected to a plurality of outgoing line terminal units. The connections to the two scanners are arranged so that only one of the incoming and outgoing line terminal units is scanned at any one time. This establishes a different time slot in the shift register and multiplex counter for each one of the incoming and outgoing line terminal units. In FIG. 5, assembler scanner 9 is connected to a plurality of incoming line terminal units (not shown), all of which are similar to LTU1 and LTU*n* of FIG. 1 and distributor scanner 67 is connected to a plurality of outgoing line terminal units (not shown), all of which are similar to LTU73 and LTU74 of FIG. 4. The poles of scanners 9 and 67 are rotated in synchronism and in phase as indicated by the mechanical linkage 86. At the time shown in FIG. 5 outgoing LTU*g* is being scanned and during the following time slot outgoing LTU*h* will be scanned. It should be noted that there are no incoming LTU's connected to the corresponding terminals of assembler scanner 9. Following the scanning of outgoing LTU*h* by scanner 67, scanner 9 will be connected to incoming LTU*c*, thus establishing a time slot for assembly, etc. It will be apparent that the operation of the shift register 5 and multiplex counter 7 of the combined assembler-distributor of FIG. 5 will be the same as in FIGS. 1 and 4 and therefore it is considered unnecessary to explain the mode of operation in detail. It should be noted that during the scanning of any incoming line, any pulse appearing on lead 55 is a read pulse and initiates the reading of the parallel character on leads 25–28 to the external utilization circuitry, and any pulse appearing on 55 during the scanning of any outgoing line is a write pulse and will initiate the application of a parallel character from the external circuitry to the leads 25–28. Thus it would be necessary that the operation of the external circuitry be correlated with the scanning action so that the output of AND gate 47 will intiate the required read operation during assembly time slots and the required write operation during the time slots assigned to distribution. The scanners 9 and 67 have been shown as separate units for clarity, however it is obvious that an integrated scanner could be constructed in which the poles 23, 24, 68 and 69 would be all rotated together with separate sets of contacts provided for all of the line terminal units.

The present invention thus provides circuitry capable of multiplex assembly of binary data, multiplex distribution of binary data or intermixed multiplex assembly-distribution thereof. The circuits of FIGS. 1, 4 and 5 are capable of assembly and/or distribution of characters of four bits each, however it will be apparent to those skilled in the art that the circuitry can be modified to accommodate characters of different bit lengths by using a shift register with a greater or lesser number of stages and also by altering the multiplex counter to produce the required read and write pulses. Also, the scanners of FIGS. 1, 4 and 5 have been illustrated as rotating switches, however in practice it may be desirable to use electronic scanners with no moving parts to achieve high speed operation.

Other obvious modifications of the disclosed inventive concepts will be apparent to those skilled in the art. Accordingly, the invention should be limited only by the scope of the appended claims.

What is claimed is:

1. A circuit for assembling serial binary data from a plurality of different input transmission lines operating at different bit frequencies on a time division multiplex basis comprising, a scanner to sequentially sample the binary data on each input transmission line, means to apply the sampled data to the input of the first stage of a shift register, the stages of which comprise delay lines, the delay of each delay line being the same as the scanning period, means responsive to the appearance of a new bit of data on any given sampled line to shift the proceeding data bits from said sampled line along said shift register and means responsive to the absence of a new bit on any given sampled line to recirculate the preceding data bits from said sampled line within said register stages, and means to generate a readout signal when said shift register has reached its capacity for any given sampled line.

2. A circuit for assembling serial binary data from a plurality of different input transmission lines operating at different transmission frequencies comprising, means to sequentially sample the data on each input transmission line and sequentially apply said data to the serial input of a shift register, the stages of said shift register comprising delay lines, means to shift the data from any given input transmission line along the stages of said shift register at a rate dependent on the transmission rate of said given transmission line, and means responsive to the assembly of an entire character from said given transmission line to initiate the readout of said character in parallel form from said shift register.

3. A multiplex serial-to-parallel converter comprising, a plurality of input transmission lines carrying binary data in serial form at different transmission rates, each of said input lines being connected to a line terminal unit, each of said line terminal units comprising a timing flip-flop, means to set each of said timing flip-flops at the end of each bit transmitted over its associated line, scanning means arranged to sequentially connect the binary data and the set output of said timing flip-flop of each line terminal unit to a shift register, said scanning means being arranged to initiate the resetting of said timing flip-flop, said shift register stages comprising delay lines each having a time delay equal to the time required for one cycle of operation of said scanning means, said scanning means being arranged to apply said binary data to the serial input of said shift register and to apply the set output of said timing flip-flop to a shift lead and to a multiplex counter, means normally connecting the output of each of said delay lines to its own input and means responsive to the presence of a pulse on said shift lead to connect the outputs of said delay lines to the input of the next succeeding delay line of said shift register, said multiplex counter comprising means to separately count the number of shift pulses received from each of said input transmission lines and to generate a read pulse when an entire character has been assembled in said shift register from any given input line, and means controlled by said read pulse to read-out said character in parallel form from said shift register to utilization means.

4. A circuit for assembling serial binary data from a plurality of different input transmission lines on a time division multiplex basis comprising, a scanner to sequentially sample the binary data on each of said input transmission lines, means to apply the sampled data to the input of the first stage of a shift register, the stages of which comprise delay lines, the delay of each delay line being the same as the period of said scanner, means responsive to the appearance of a new bit of data on any sampled line to shift the preceding data bits from said sampled line along said shift register and means responsive to the absence of a new bit on any given sampled line to recirculate the preceding data bits from said sampled line within said register stages; a multiplex counter connected to said scanner and said shift register, said multiplex counter being arranged to separately count the number of data bits received from each of said input transmission lines and to generate a read pulse when an entire character has been assembled in said shift register from any given input line, and means controlled by said read pulse to read out said character in parallel from said shift register to external circuitry.

5. A multiplex serial-to-parallel converter comprising, a shift register comprising first, second and third identical delay lines, means normally connecting the outputs of said delay lines to their respective inputs for recirculation of data within the delay lines, a shift lead, means responsive to the presence of a pulse on said shift lead to prevent recirculation of data within said delay lines and to connect the output of said first delay line to the input of said second delay line and the output of said second line to the input of said third delay line, scanning means to sequentially sample serial data on a plurality of incoming transmission lines carrying data in serial form and to apply said data to the input of said first delay line, the time delay of each of said first, second and third delay lines being equal to a single cycle of operation of said scanning means, said scanning means being arranged to apply a pulse to said shift lead each time that a new bit of data appears on any of said transmission lines, means to read out parallel data from the inputs of said first, second and third delay lines and the output of said third delay line, a multiplex counter arranged to separately count the number of pulses which appear on said shift lead during the sampling of each of said transmission lines and to generate a read pulse when four of said pulses are counted for any given transmission line, said multiplex counter comprising a binary adder, said adder having four inputs and first and second outputs, said adder arranged to sum the number of its inputs on which pulses appear, said first adder output representing the least significant bit of said sum and said second adder output the most significant bit of said sum, first and second counter delay lines having inputs connected respectively to said first and second adder outputs, said counter delay lines having delays equal to a single cycle of operation of said scanning means, the output of said first counter delay line forming one of the inputs of said adder and the output of said second counter delay line forming two of the inputs of said adder, said shift lead being connected to and forming the fourth input of said adder, the outputs of said first and second counter delay lines also forming two of the inputs of a three-input AND gate, the remaining input of which is said shift lead, said read pulse being obtained from the output of said AND gate.

6. A circuit for distributing parallel binary data to a plurality of different output serial transmission lines operating at different bit transmission frequencies comprising, a scanner for sequentially connecting the serial output of a shift register to said serial transmission lines, the stages of said shift register comprising delay lines, the delay of each of said delay lines being the same as the period of said scanner, means to apply a first parallel character of data to the parallel inputs of said shift register during the scanning of a given line, and means to feed the bits of said character serially from the serial output of said shift register to said given output transmission line at a rate determined by the bit transmission frequency of said given line, and means to apply a new character to said parallel inputs following the transmission of the last bit of said first parallel character.

7. A circuit for distributing parallel binary data to a plurality of different output serial transmission lines on a time division multiplex basis, comprising a shift register the stages of which comprise delay lines, a scanner for sequentially connecting the serial output of said shift register to said serial transmission lines, the delay of each of said delay lines being equal to the period of said scanner, means to apply a parallel character to said shift register during the scanning of a given output serial transmission line and means to simultaneously feed the first bit of said character to said given output transmission line, means to feed out the remaining bits of said character from the serial output of said shift register on succeeding scans of said output transmission line at a rate equal to the bit frequency of said given output serial transmission line.

8. A combined assembler-distributor for the intermixed serial-to-parallel and parallel-to-serial conversion of binary data comprising, a shift register the stages of which comprise delay lines, said shift register including, a shift lead, a serial input, a serial output and parallel input-output, an assembler scanner arranged to sequentially connect one of a plurality of incoming line terminal units to said serial input and to said shift lead of said shift register, a distributor scanner arranged to sequentially connect one of a plurality of outgoing line terminal units to said serial output and said shift lead of said shift register, each of said incoming line terminal units being connected to an incoming line carrying serial binary data and each of said outgoing line terminal units being connected to an outgoing line carrying serial binary data, said scanners being synchronously rotated so that only one of said incoming and outgoing line terminal units is scanned at any one time, the delay of each of said delay lines being the same as the scanning period of each of said scanners, means to shift the data from any given incoming line terminal unit along the stages of said shift register at a rate dependent on the transmission rate of the given incoming line and means responsive to the assembly of an entire character from any given incoming line to initiate the readout of said character in parallel from said parallel input-output of said shift register; and means to apply a parallel character to the parallel input-output of said shift register synchronously with the scanning of a given outgoing line and means to shift said character along said shift register to the serial output thereof at a rate controlled by the transmission rate of said given outgoing line.

9. A combined assembler-distributor for the intermixed serial-to-parallel and parallel-to-serial conversion of binary data, comprising a shift register, the stages of which comprise delay lines, said shift register including a serial input, a serial output and a parallel input-output, an assembler scanner arranged to sequentially connect one of a plurality of incoming line terminal units to said serial input of said shift register, a distributor scanner arranged to sequentially connect one of a plurality of outgoing line terminal units to said serial output of said shift register, each of said incoming line terminal units being connected to an incoming line carrying serial binary data and each of said outgoing line terminal units being connected to an outgoing line carrying serial binary data, said scanners being synchronously rotated and arranged so that only one of said incoming and outgoing lines is scanned at any one time, the delay of each of said delay lines being the same as the scanning period of each of said scanners, means responsive to the appearance of a new bit of data on any given scanned incoming line to shift the preceding data bits from said given scanned incoming line along the stages of said shift register and means responsive to the absence of a new bit on any given scanned incoming line to recirculate the preceding data bits from said given scanned incoming line within the stages of said shift register, and means responsive to the assembly of an entire character from said given scanned line to initiate the parallel readout of said character from said shift register, and means to apply a parallel character to the parallel input-output of said shift register synchronously with the scanning of a given outgoing line and means to feed the bits of said character serially from said serial output of said shift register to said given outgoing line at a rate determined by the transmission frequency of said given outgoing line, and means to apply a new character to said parallel input-output following the feeding of the last bit of said character to said given outgoing line.

References Cited by the Examiner

UNITED STATES PATENTS

| | | | |
|---|---|---|---|
| 2,635,229 | 4/1953 | Gloess et al. | 340—167 |
| 2,729,811 | 1/1956 | Gloess | 340—167 |

NEIL C. READ, *Primary Examiner*.

A. J. KASPER, *Assistant Examiner*.